ated States, residing at
UNITED STATES PATENT OFFICE.

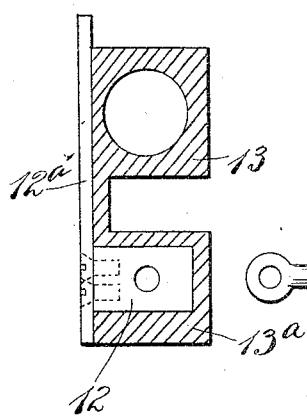
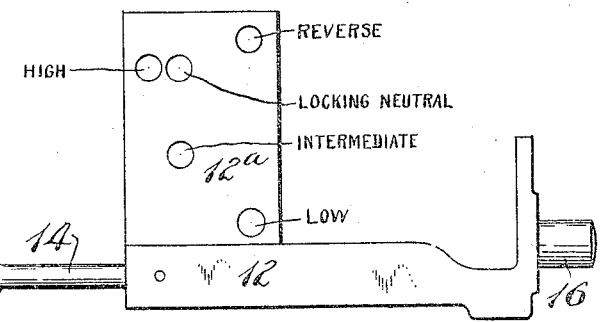
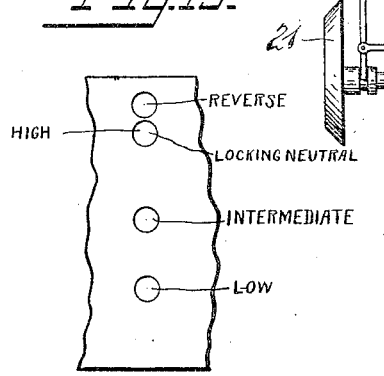
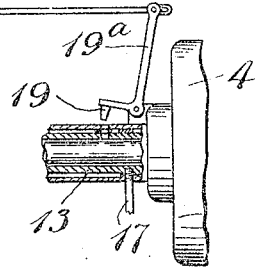

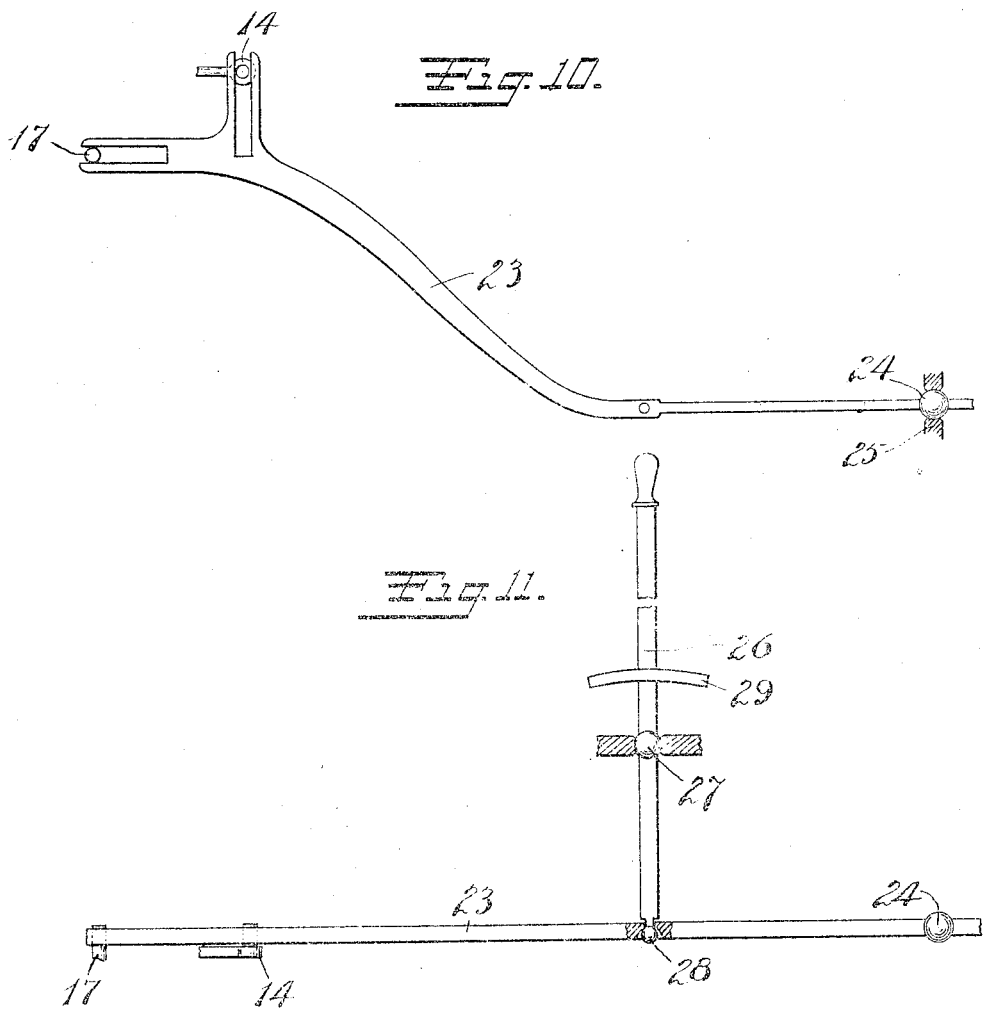

CHARLES E. DURYEA, OF READING, PENNSYLVANIA, ASSIGNOR TO CORBIN MOTOR VEHICLE CORPORATION, OF NEW BRITAIN, CONNECTICUT, A CORPORATION OF CONNECTICUT.

TRANSMISSION MECHANISM.

No. 897,261.  Specification of Letters Patent.  Patented Aug. 25, 1908.

Application filed September 28, 1907. Serial No. 394,96?

*To all whom it may concern:*

Be it known that I, CHARLES E. DURYEA, a citizen of the United States, residing at Reading, county of Berks, State of Pennsylvania, have invented certain new and useful Improvements in Transmission Mechanism, of which the following is a full, clear, and exact description.

My invention relates to improvements in transmission mechanism, the object being to provide a transmission which will afford various speed ratios, as well as reverse, and which may be employed, for example, on the rear axle of a vehicle, although the particular location is not absolutely essential.

While the invention is particularly useful in connection with automobiles or motor vehicles, its use is not limited thereto, the object of the invention, broadly speaking, being to provide a simple and effective construction whereby two or more speed changes may be effected, likewise reverse.

Figure 1:
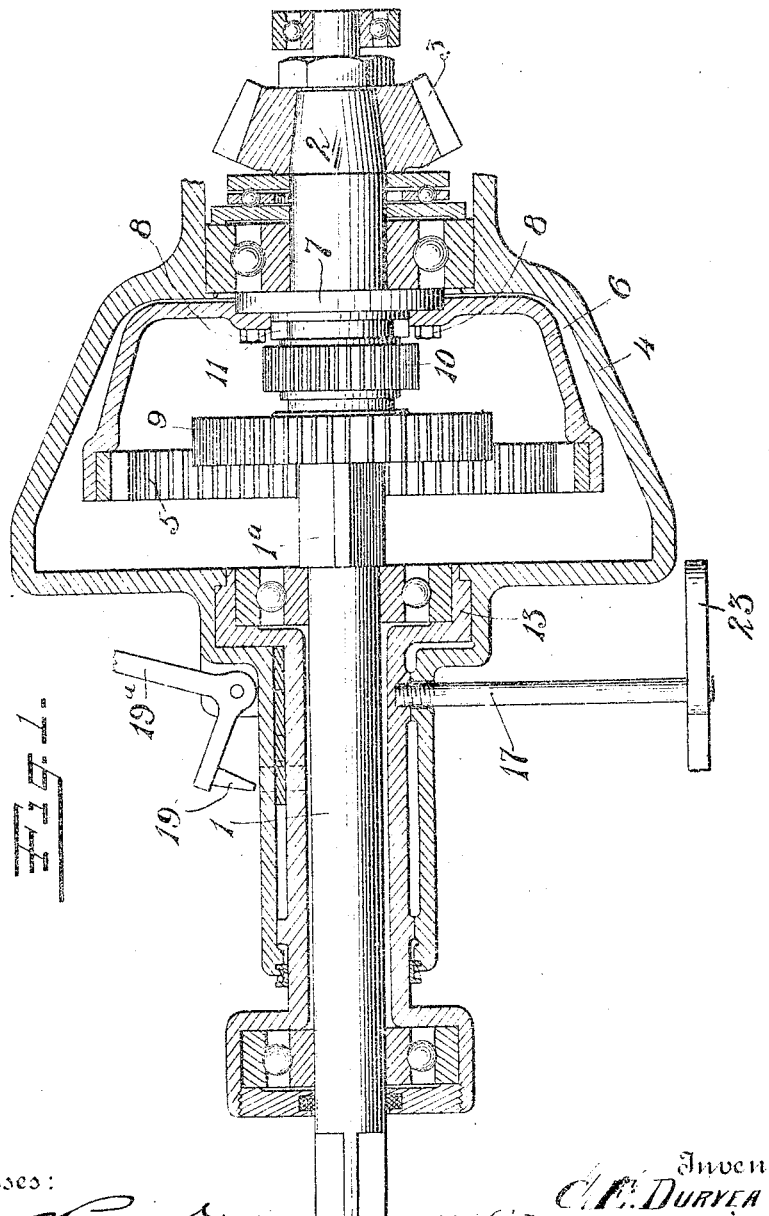
Figure 2:
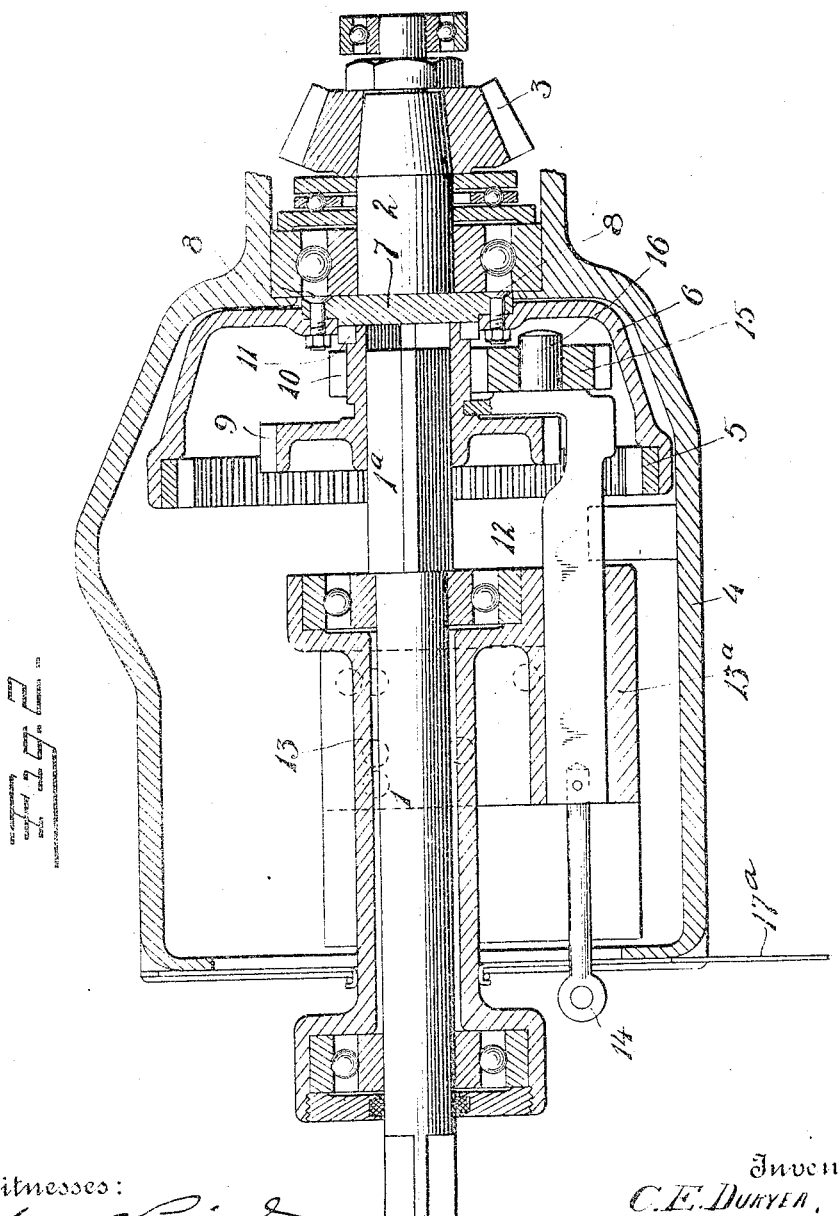

In the accompanying drawings, Figure 1 is a longitudinal sectional view, certain parts being shown in elevation; Fig. 2 is a longitudinal sectional view taken at right-angles to the plane of the section shown in Fig. 1; Figs. 3, 4, 5 and 6 are detail views partly in section, showing the various positions of the gears; Fig. 7 is a sectional view of a detail of construction, detached; Fig. 8 is a plan view thereof; Fig. 9 is a diagrammatic view, relatively reduced, of certain operating parts; Figs. 10, 11, 12 and 13 are detail views of other parts.

1 represents a driving shaft; 2 the driven shaft.

3 represents a gear of the driven shaft from which power may be taken by another gear (not shown), for example, the usual differential gear construction, such as provided in automobiles.

4 is a gear casing, which, when the transmission is to be employed on the rear axle, may be integral with the casing containing the usual differential gear. The rear end of the casing 4 is shown as broken away to indicate that that end may assume any desired shape. Any desired form of bearings may be employed for the driving and driven shafts, the bearings shown being the annular ball type.

5 is an internal gear carried by a suitable frame 6, the latter being connected to the driven shaft through the medium of a head 7 and bolts 8—8.

9—10 are gears of different ratios, fixed on a common sleeve so as to move together. The sleeve of these gears is fitted so as to slide only upon the squared end 1ª of the driving shaft. At the end of the sleeve, carrying the gears 9—10, are clutch jaws, which are arranged at certain times to engage with corresponding clutch jaws on the head 7. This end clutch is indicated at 11 (Fig. 2).

12 is a gear shifter slidable in extension 13ª of the bracket 13, which supports the bearings for the driving shaft.

14 is an exposed part of the gear shifter, which may be manipulated for the purpose of shifting the gears 9 and 10 longitudinally on the squared end of the shaft 1.

15 is a pinion mounted on a stud 16 carried, for example, by a part of the gear shifter 12, the same being always in mesh with gear 10.

17 is a second shifter which makes suitable connection with the bracket 13 through a slot in case 4. (See Fig. 1). Bracket 12 is mounted in such a way in the case 4 that it may be shifted laterally.

17ª is a cover-plate for the space at the rear of the case 4, in which the bracket slides.

At this point it may be stated, that a lateral shifting of the driving shaft may be readily effected in ordinary automobile construction without danger, since the driving shaft is always provided with a universal or flexible joint toward its forward end at least, and well away from the rear axle, the function being to prevent binding as the vehicle springs work up and down. The lateral shifting required for the gear changes is much less than the vertical movement that is regularly compensated for by this flexible connection.

Figure 3:
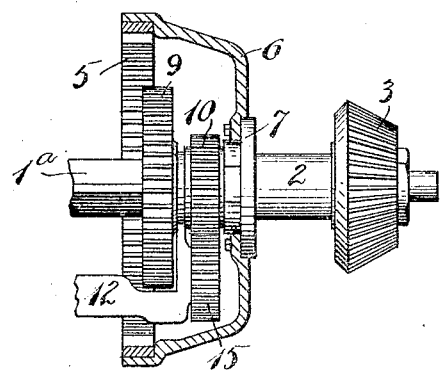
Figure 4:
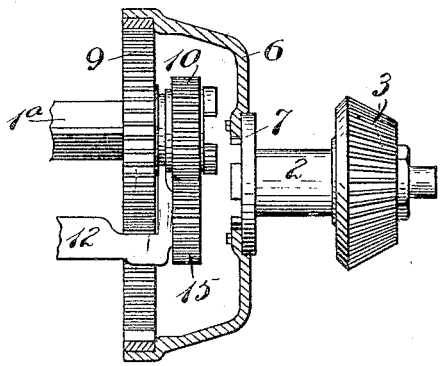
Figure 5:
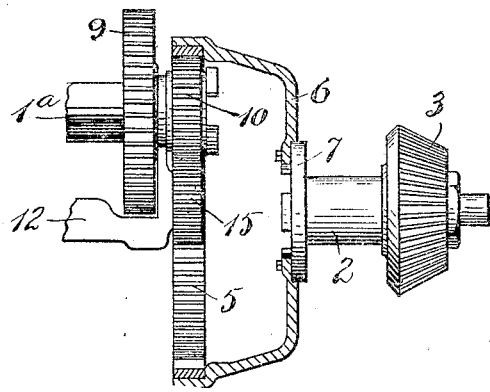
Figure 6:
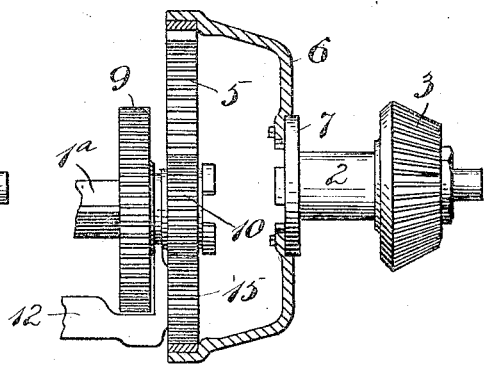

Having thus explained the main elements of the construction, the operation will be readily understood. When the parts are as shown in Figs. 1, 2 and 3, a "direct drive" so-called is being effected. In other words, power entering through the driving-shaft 1 is transmitted directly to the driven-shaft 2, through the medium of the clutch 11. Now assuming it is desired to reduce the speed of the driven-shaft relatively to the driving-shaft, the operator shifts the position of the gears 9 and 10 on the squared part 1ª of the driving-shaft, first freeing clutch 11. This is done by the shifter 14. When the gear 9 faces up with the internal gear 5, the bracket 13 is shifted laterally by shifter 17, until gears 9 and 5 are meshed, whereupon power will be transmitted from the driving-shaft 1 to driven-shaft 2, through the medium of gears 9 and 5. This position is shown in Fig. 4. A still further reduction of the speed in the driven-shaft relatively to the driving-shaft may be effected by shifting the gears 9 and 10 still further along on the squared part of the driving-shaft 1 and until gear 10 faces up with gear 5. By then moving the bracket 13 laterally to a still further extent, gear 10 will mesh with gear 5, and power will be transmitted through said gears to the driven-shaft at a relatively reduced speed. This position is indicated in Fig. 5. When it is desired to reverse the rotation of shaft 2 relatively to shaft 1, the bracket 13 is shifted laterally until the gears move from the position indicated in Fig. 5 to that indicated in Fig. 6, whereupon the pinion 15 will mesh with the internal gear 5. Thus, through the medium of the intermediate gear 15, the driven-shaft will be rotated in a reverse direction, and as is proper, at a relatively reduced speed. It will thus be seen that by this simple and compact arrangement I am enabled to secure three different speeds in the forward direction of a single reverse. As will be observed, these varying speeds are secured by the use of a single clutch and one internal gear. By the use of annular ball bearings the driving member 1 is held against longitudinal movement in the bracket 13, as will be seen on reference to Figs. 1 and 2.

In Figs. 7 to 12 I have shown various details and arrangement of parts, for the purpose of illustrating a suitable lever system by which, by the use of a single lever, these various changes may be effected. I have also shown a safety means which I will first describe. 12ᵃ is a plate offset from gear shifter 12. 19 is a safety stud carried by a pivoted bell-crank lever 19ᵃ, the same being connected by a link 20 with the engine clutch 21, the same being controlled by the foot pedal 22, in the usual manner. In the plate 12ᵃ and bracket 13 are various perforations, one of which in each will always face up with the safety stud 19, when the clutch or gears are in one of the several operative positions. With one exception, at other times the solid or imperforate surface of bracket 13 or plate 12ᵃ will stand in front of the stud 19. At such times, of course, the bell-crank lever 19ᵃ cannot swing in the direction to permit the clutch 21 to be engaged with the engine, whereas when the gears are in operative position the safety stud 19 will drop into one of the perforations in plate 12ᵃ, and hence the bell-crank lever 19ᵃ will swing in the direction to permit the clutch 21 to be engaged with the engine. From the foregoing it follows that the gears must be properly positioned before power can be thrown onto shaft 2. 23 is a lever having a universal bearing 24 at one end, the connection being such that said lever 23 may slide as well as rock and swing therein. This bearing 24 is mounted in a suitable fixed support 25. The other end of the lever 23 is provided with two bifurcated extensions, arranged at right angles to each other, and making a sliding connection respectively with the operating parts 14 and 17. 26 represents the hand lever mounted in a universal bearing 27, the lower end of said lever 26 being connected at 28 with the lever 23. By means of the lever 26, the lever 23 may be advanced or retracted, or moved to either side, so as to shift either one of the operating parts 14 or 17 to the desired extent in the desired direction. 29 is a guide rack having a suitable guide slot therein, as shown (see Fig. 12). When the lever 26 is in the position indicated in section in said Fig. 12, the clutch 11 is in, and direct drive occurs. $a$, $b$ and $c$ represent recesses in said guide slot, into which the lever 26 may be projected. When the lever 26 is moved from the position shown in Fig. 12 to the bottom of recess $a$, this shifting movement will first free the clutch 11 and then bring the gear 9 into mesh with gear 5. When the lever 26 is shifted from recess $a$ to the bottom of recess $b$, it will first free the gears 9 and 5 and then bring the gears 10 and 5 into mesh. When the lever is shifted from the bottom of recess $b$ to the bottom of recess $c$, it will first free the gear 10 from gear 5 and then bring pinion 15 into mesh with gear 5. The holes in plate 12ᵃ are so positioned, that it is only when the lever stands in the position shown in Fig. 12, or in the bottom of one of the recesses $a$, $b$ or $c$, that the pin can enter. Consequently, at all other times, the clutch 27 will be held out of engagement with the engine (not shown).

On referring to Fig. 10, it will be seen that it is only a lateral movement of the lever 23 that affects the part 14, while it is only a longitudinal movement of the lever 23 that affects the part 17. By this simple arrangement safety is always guaranteed and danger of stripping the gears is entirely avoided.

In shifting from one speed to another, it will be seen that the operation involves passing through a neutral position in all cases, and that from the neutral position a shift may be made to any one of the several working or active positions without passing through any other active position.

While I have shown a construction adapted to three speeds forward, it must be understood that my invention is not confined or limited thereto, since any number of gears may be included in the group now formed by gears 9 and 10.

In the drawing, particularly Fig. 8, I have shown that one perforation may be provided in plate 12ª to permit locking in a neutral position. This perforation will register with one of the regular perforations in bracket 13.

What I claim is—

1. In a transmission mechanism, a driving-shaft, a driven shaft, a plurality of change speed gears held against rotation but adapted to slide on one of said shafts, an internal gear connected to the other shaft, means to shift the first-mentioned gears longitudinally on their shaft support to cause either one to face said internal gear, and means to shift the first-mentioned gears and their support laterally to cause either of said gears to mesh with said internal gear.

2. In a transmission mechanism, a driving-shaft, a driven-shaft, a plurality of change speed gears held against rotation but adapted to slide on one of said shafts, an internal gear connected to the other shaft, means to shift the first-mentioned gears longitudinally on their shaft support to cause either one to face said internal gear, means to shift the first-mentioned gears and their support laterally to cause either of said gears to mesh with said internal gear, and a clutch arranged to positively couple and uncouple both of said shafts when all of said gears are out of mesh.

3. In a transmission mechanism, a driving-shaft, a driven-shaft, a plurality of change speed gears held against rotation but adapted to slide on one of said shafts, an internal gear connected to the other shaft, means to shift the first-mentioned gears longitudinally on their shaft support to cause either one to face said internal gear, means to shift the first-mentioned gears to mesh with said internal gear, and an intermediate pinion in mesh at all times with one of the gears on one of the shafts, and arranged to engage the gear on the other shaft by the lateral displacement of one of the shafts.

4. In a power transmission mechanism, a speed changing gear comprising a driving-shaft, a high and low speed gear directly driven by said shaft, a clutch, one member of which is connected to said gears, a driven-shaft, the other member of the clutch being carried thereby, an internal gear also carried thereby, and means to cause the lateral and longitudinal shifting movement of the first-mentioned gears and clutch member, substantially as and for the purpose specified.

5. In a power transmission mechanism, a speed changing gear comprising a driving-shaft, a high and low speed gear directly driven by said shaft, a clutch, one member of which is connected to said gears, a driven-shaft, the other member of the clutch being carried thereby, an internal gear also carried thereby, and means to cause the lateral and longitudinal shifting movement of the first-mentioned gears and clutch member, substantially as and for the purpose specified, a pinion in mesh with one of the first-mentioned gears at all times and arranged to be engaged with the internal gear at will.

6. In a power transmission mechanism, a driving member, a driven member, an internal gear secured to one of said members, a plurality of connected gears of different diameters mounted to slide on the other member, means for shifting said last-mentioned gears longitudinally on said last-mentioned member, and means for shifting said last-mentioned member laterally to bring either of said gears into engagement with the internal gear at will.

7. In a power transmission mechanism, a driving member, a laterally movable supporting bracket therefor, a plurality of connected gears of different diameters arranged to slide on said driving member, means for sliding said gears on said driving member, a driven member, a bearing therefor, an internal gear carried by the driven member, a clutch member connected with the first-mentioned gears, a second clutch member connected with the driven member, and means for shifting the bracket for the driving member laterally.

8. In a power transmission mechanism, a driving member, a laterally movable supporting bracket therefor, a plurality of connected gears of different diameters arranged to slide on said driving member, means for sliding said gears on said driving member, a driven member, a bearing therefor, an internal gear carried by the driven member, a clutch member connected with the first-mentioned gears, a second clutch member connected with the driven member, means for shifting the bracket for the driving member laterally, and a pinion movable with the first-mentioned gears and arranged to connect one of said gears with said internal gear, as desired.

9. In a power transmission mechanism, a driving member, a driven member, bearings therefor and including a laterally shiftable bracket for one of said members, a plurality of gears of different diameters connected and slidably mounted on the driving member, a shifting device therefor, a pinion carried thereby in mesh with one of said gears, a bearing for said shifting device in said bracket, a clutch comprising two members, one slidably mounted on the driving member, the other secured to the driven member, and a gear carried by the driven member and arranged to mesh with each of the gears on the driving member.

CHARLES E. DURYEA.

Witnesses:
R. C. MITCHELL,
LANGDON MOORE.